No. 88,641.

P. P. JOSEF.
EGG CARRIER.

PATENTED APR. 6, 1869.

Witnesses,

Inventor:
Philip P. Josef

United States Patent Office.

PHILIP P. JOSEF, OF BUFFALO, NEW YORK.

Letters Patent No. 88,641, dated April 6, 1869; antedated January 11, 1869.

IMPROVEMENT IN EGG-CARRIER.

The Schedule referred to in these Letters Patent and making part of the same.

*To all whom it may concern:*

Be it known that I, PHILIP P. JOSEF, of Buffalo, in the county of Erie, and State of New York, have invented a new and improved Egg-Carrier; and I do hereby declare that the following is a full, clear, and exact description thereof, which will enable others skilled in the art to make and use the same, reference being had to the accompanying drawings, forming part of this specification, in which—

Similar letters and figures indicate like parts.

This invention relates to a new and improved method of packing eggs for transportation, the object being to obtain a carrier, which may be cheaply manufactured, which will occupy as small a space as possible, consistent with safety, and perfectly secure the eggs against breakage.

A A represents the crate, or holder, containing the trays or frames $F^1\ F^2\ F^3$, with their depressions or pockets $a^1\ a^2$, $b^1\ b^2$, but as this crate forms no part of my invention, it does not here need any detailed description.

$F^1\ F^2\ F^3$ are wooden frames, constructed and secured in any ordinary and usual mode known to workers in wood.

$a^1\ a^2\ b^1\ b^2$ represent the depressions or pockets for containing eggs.

Figure 1:
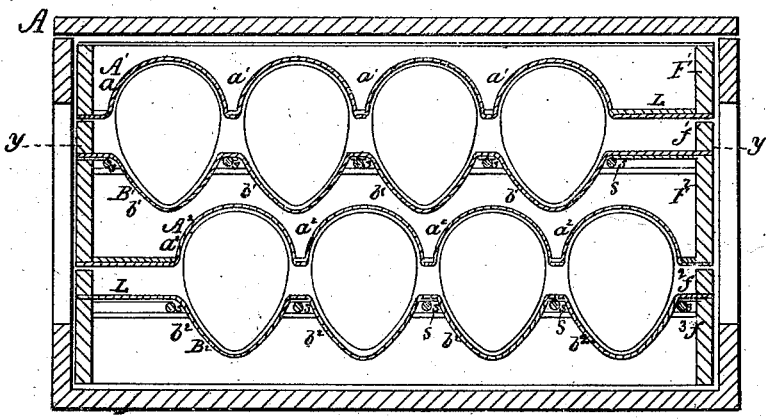
Figure 1 is a vertical sectional view of my invention; ($x\ x$, fig. 2, indicates the line of section.)
Figure 2:
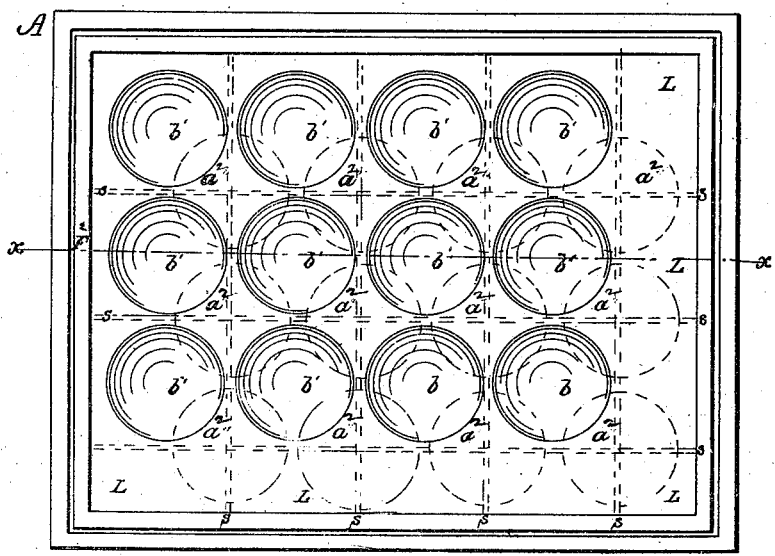
Figure 2 is a plan view of the same, taken in the line $y\ y$ of fig. 1.

Fig. 1 shows the manner in which eggs are placed therein.

These depressions, or pockets, or cloth, or other material composing or containing the same, are arranged and secured upon the frames, as follows:

The lower series of said depressions $b^1\ b^2$ are secured upon the upper edges of the frames $F^2\ F^3$, being intended to receive and sustain the small or lower end of the egg. The upper series of the same are secured upon the under edges of the frames $F^1\ F^2$, being intended to receive and enclose the large, or upper end of the egg previously placed in the depressions $b^1\ b^2$, the succeeding and corresponding series of lower and upper depressions being so arranged as to be exactly opposite each other when placed in their proper positions in the crate, or holder intended for them.

In order to obtain a greater economy of space, the series of upper and lower depressions, secured to the under and upper edges of the same frame, are made to project into or occupy the interspaces left by each, as at $b^1\ a^2$ in the frame $F^2$.

L L L are offsets, or blank spaces, left on two contiguous sides surrounding the depressions in the cloth, or other material composing or containing the same.

In order to form the said depressions, or pockets, in the most economical and perfect manner, I take a piece, of the required size, of the fabric known as "burlaps," or other suitable material, either of cloth, felt, or paper, the same being of a soft or yielding texture, and submit it to pressure between properly-constructed dies, which dies may be used with or without heat, according to the nature of the material employed for said depressions.

I also, if necessary, further stiffen and sustain these depressions, or cloth, or other material, composing or containing the same, by the addition of paper, or its equivalent, or size, or varnish, or their equivalents, or a combination of these articles, and, furthermore, by the addition of wooden or metallic cross-bars affixed to the frames, as shown by the dotted lines $s\ s, s\ s, s\ s\ s$.

$f\ f$ are narrow strips, or frames, of wood, secured upon the frames $F^2\ F^3$, immediately on and above the depressions $b^1\ b^2$, or cloth, or other material composing or containing the same, the object of said strips or frames being to keep the corresponding and succeeding series of depressions apart, so that various sizes of eggs may be properly and sufficiently enclosed and supported.

What I claim as new, and desire to secure by Letters Patent, is—

Enclosing and sustaining eggs for transportation between a series of upper and lower depressions, $a^1\ a^2\ b^1\ b^2$, constructed and arranged substantially as and for the purpose set forth.

PHILIP P. JOSEF.

Witnesses:
GEO. SOOTHERAN,
GEO. D. EMERSON.